(12) United States Patent
Steiger et al.

(10) Patent No.: US 10,102,291 B1
(45) Date of Patent: Oct. 16, 2018

(54) COMPUTERIZED SYSTEMS AND METHODS FOR BUILDING KNOWLEDGE BASES USING CONTEXT CLOUDS

(71) Applicant: Google Inc., Mountain View, CA (US)

(72) Inventors: Sebastian Steiger, Zurich (CH); Christopher Semturs, Ottenbach (CH); Henrik Grimm, Zurich (CH); Lode Vandevenne, Zurich (CH); Danila Sinopalnikov, Adliswil (CH); Nathanael Martin Schärli, Lotzwil (CH); David Lecomte, Zurich (CH); Alexander Lyashuk, Adiswil (CH)

(73) Assignee: GOOGLE LLC, Mountain View, CA (US)

( * ) Notice: Subject to any disclaimer, the term of this patent is extended or adjusted under 35 U.S.C. 154(b) by 425 days.

(21) Appl. No.: 14/792,583

(22) Filed: Jul. 6, 2015

(51) Int. Cl.
*G06F 17/30* (2006.01)

(52) U.S. Cl.
CPC .. *G06F 17/30867* (2013.01); *G06F 17/30607* (2013.01); *G06F 17/30958* (2013.01)

(58) Field of Classification Search
CPC ......... G06F 17/30867; G06F 17/30958; G06F 17/30607
USPC ....... 707/603, 724, 727, 729, 730, 750, 797, 707/798, 800, 802, 805, 811, 825, 829, 707/830
See application file for complete search history.

(56) References Cited

U.S. PATENT DOCUMENTS

| | | | |
|---|---|---|---|
| 7,970,766 B1 | 6/2011 | Shamsi et al. | |
| 8,000,956 B2 | 8/2011 | Brun et al. | |
| 9,390,174 B2 * | 7/2016 | Zhou | G06F 17/30864 |
| 2009/0012842 A1 | 1/2009 | Srinivasan et al. | |
| 2011/0231347 A1 | 9/2011 | Xu | |
| 2012/0239682 A1 * | 9/2012 | Wedeniwski | G06F 17/30663 707/769 |
| 2013/0132381 A1 * | 5/2013 | Chakrabarti | G06F 17/30864 707/730 |
| 2013/0325881 A1 | 12/2013 | Deshpande et al. | |
| 2014/0108322 A1 | 4/2014 | Buchanan et al. | |
| 2014/0337306 A1 | 11/2014 | Gramatica | |
| 2015/0006512 A1 | 1/2015 | Alfonseca et al. | |
| 2015/0286709 A1 * | 10/2015 | Sathish | G06N 7/005 706/52 |
| 2016/0357870 A1 * | 12/2016 | Hentschel | G06F 17/30528 |

* cited by examiner

*Primary Examiner* — Greta L Robinson
(74) *Attorney, Agent, or Firm* — Middleton Reutlinger (57) ABSTRACT

Computer-implemented systems and methods are disclosed for building knowledge bases, such as knowledge graphs, using context clouds. According to certain embodiments, a target object is identified in a portion of unstructured or semi-structured data in a target document, which does not conform to a predefined structure or pattern. A knowledge server may build a context cloud for the target document. The knowledge server may analyze one or more other documents stored in a networked database, to identify candidate documents that may include a meaning or relationship associated with the target object. The knowledge server may analyze one or more context clouds for the candidate documents to determine a meaning or relationship of the target object based on objects in the candidate document(s). The knowledge server may associate the determined meanings and/or relationships with the target object in the target document, thereby creating a new portion of a knowledge graph.

15 Claims, 9 Drawing Sheets

COMPUTERIZED SYSTEMS AND METHODS FOR BUILDING KNOWLEDGE BASES USING CONTEXT CLOUDS

BACKGROUND

The present disclosure generally relates to the field of information processing and database techniques. More specifically, and without limitation, the exemplary embodiments described herein relate to computerized systems and methods for building knowledge bases using context clouds.

A knowledge base can provide a repository of structured and unstructured data. A structured knowledge base may include, for example, one or more knowledge graphs. The data stored in a knowledge base may include information related to entities, facts about entities, and relationships between entities. The data stored in knowledge bases can be used for various purposes, including to process and respond to user search queries submitted to a search engine.

The data stored in a knowledge base may be created and expanded using information from a wide variety sources, such as electronic documents accessible over a network, including the Internet. Examples of such documents include webpages, articles, press releases, news items, technical papers, and the like. Webpages and other documents may provide information on entities, as well as relationships between entities. Other sources, such as managed databases, may provide information on known entities and relationships between entities.

SUMMARY

Consistent with the present disclosure, computer-implemented systems and methods are provided for building knowledge bases using context clouds. Embodiments consistent with the present disclosure include computer-implemented systems and methods for parsing text in at least one document on the Internet and detecting a target object in unstructured portions of the parsed text. In addition, systems and methods consistent with the present disclosure may identify objects that are proximate to the target object, determine one or more context clouds for the target object based on the proximate objects, and determine a relationship associated with the target object, based on an analysis of the proximate objects, the context clouds, and an analysis of other documents containing the target object.

In accordance with one exemplary embodiment, a computer-implemented system for generating knowledge graphs is provided. The system comprises a memory device that stores a set of instructions, and at least one processor. The processor may execute the stored instructions to detect a first data object in a document on the Internet, detect a second data object proximate to the first data object in the document, identify a third data object associated with the second data object, based on a frequency of co-occurrence of the second data object and the third data object in one or more stored occurrence lists, and generate, in knowledge graph stored in a database, a first entry including the first data object and at least one of the third data object or a first predefined relationship between the second data object and the third data object.

In accordance with another exemplary embodiment, a computer-implemented method for generating knowledge graphs is provided. The method comprises operations performed by at least one processor, including detecting a first data object in a document on the Internet, detecting a second data object proximate to the first data object in the document, and identifying a third data object associated with the second data object, based on a frequency of co-occurrence of the second data object and the third data object in one or more stored occurrence lists. The method also includes generating, in a knowledge graph stored in a database, a first entry including the first data object and at least one of the third data object or a first predefined relationship between the second data object and the third data object.

In accordance with yet another exemplary embodiment, a non-transitory computer readable medium storing instructions is provided. The stored instructions, when executed, may cause at least one processor to perform a method for generating knowledge graphs. The method may comprise detecting a first data object in a document in the Internet, detecting a second data object proximate to the first data object in the document, identify a third data object associated with the second data object, based on a frequency of co-occurrence of the second data object and the third data object in one or more stored occurrence lists, and generating, in knowledge graph stored in a database, a first entry including the first data object and at least one of the third data object or a first predefined relationship between the second data object and the third data object.

It is to be understood that the present disclosure is not limited in its application to the details and arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

Those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Embodiments of the present disclosure provide improved systems and methods for building knowledge graphs using context clouds. The context clouds may include co-occurring objects, such as words, numbers, characters, and groupings thereof. The disclosed embodiments may analyze unstructured information using a database of co-occurrences between objects of the unstructured information and known or structured objects, to determine relationships between the unstructured data objects and the known/structured objects. In addition, features about the unstructured data objects may be determined, such as definitions, attributes, and categories associated with the unstructured data objects.

Embodiments of the present disclosure also relate to computer-implemented systems and methods that generate and dynamically update one or more occurrence lists identifying objects that appear concurrently in one or more documents, and store the occurrence lists for later use in analyzing unstructured data objects. The terms "object" and "entity" are used interchangeably throughout the present disclosure. Examples of objects and entities include a word, letter, number, symbol, and combinations thereof. Objects and entities may also refer to words, numbers, or symbols of a particular meaning, such as a date, a percentage, a temperature, a time, a place, a person, a thing, a concept, an action, and the like.

Embodiments of the present disclosure also relate to computer-implemented systems and methods that generate occurrence lists ad hoc or on an as-needed basis. In some embodiments, systems and methods may be provided that create and continuously update occurrence lists that identify the objects and a frequency of occurrence of each object in each document, for determining whether two objects co-occur in a given document.

In some embodiments, a computer-implemented system may parse a string of characters in a website or other document, and identify a target object in the string of characters. The processor may identify one or more objects that occur proximate to the target object, such as other words, numbers, and/or symbols in the same sentence, paragraph, or proximate spatial location to the target object. The proximate objects that co-occur in the same website or other document as the target object can be considered a "context cloud" of the target object. A target object may have many context clouds, each context cloud being associated with a different definition or usage of the target object. For example, a target object which is a particular date (e.g., month, day, and year) could have a first context cloud for people born on that date, a second context cloud for people who passed away on that date, additional context clouds for events that occurred on that date, etc. Each context cloud can include other objects, such as entities (people, places, things), and attributes of the objects. Furthermore, each context cloud can include structured data with known relationships, semi-structured data with estimated relationships, and unstructured data with unknown relationships beyond a frequency of co-occurrence.

Consistent with the present disclosure, semi-structured and unstructured data in a context cloud can include free-form text which does not conform to a known sentence structure or relationship structure. For example, a computer-implemented system may recognize the data structure "Date of Birth: Oct. 16, 1992" as a birthdate, whereas the phrase "born on the $16^{th}$ of October" may be considered free-form, unstructured data. In some embodiments, the phrase may be considered semi-structured data, when "$16^{th}$ of October" is recognized as a known data structure of a Day and Month, but the phrase "born on" does not conform to a recognized data structure. In such embodiments, the words "born on" may be associated with the context cloud of the object date "October 16," even though the relationship between "born on" and "October 16" is unknown.

In still further embodiments of the present disclosure, previously-created context clouds and/or knowledge graphs may serve as seed knowledge for determining relationships between the unstructured data objects such as a target object and a proximate object. The seed knowledge may be analyzed to identify one or more terms or phrases that co-occur with the target object in the seed knowledge, and to identify one or more candidate context clouds in the seed knowledge that may contain a meaning or relationship associated with the target object. For example, one or more occurrence lists may be queried to identify other documents where a target object appears, and the proximate objects to the target object in the other documents. Then, candidate documents may be identified which are estimated to be related to the target object, and context cloud(s) associated with the identified candidates may be created or recalled. Thereafter, the context clouds may be analyzed against a target context cloud, and may indicate a relationship or meaning associated with the target object, and the system may expand one or more knowledge graphs by associating the known relationship/meaning with the target object of the unstructured data.

Thus, the present embodiments can analyze unstructured data, and determine meanings and relationships associated with target objects in the unstructured data, for building or expanding a knowledge graph. Such embodiments do not require manual input related to the relationship or meaning, and can improve the accuracy of search results and data mining, and overcome the difficulties of cataloguing and searching unstructured data.

Reference will now be made in detail to the exemplary embodiments implemented according to the disclosure, the examples of which are illustrated in the accompanying drawings. Wherever possible, the same reference numbers will be used throughout the drawings to refer to the same or like parts.

Figure 1:
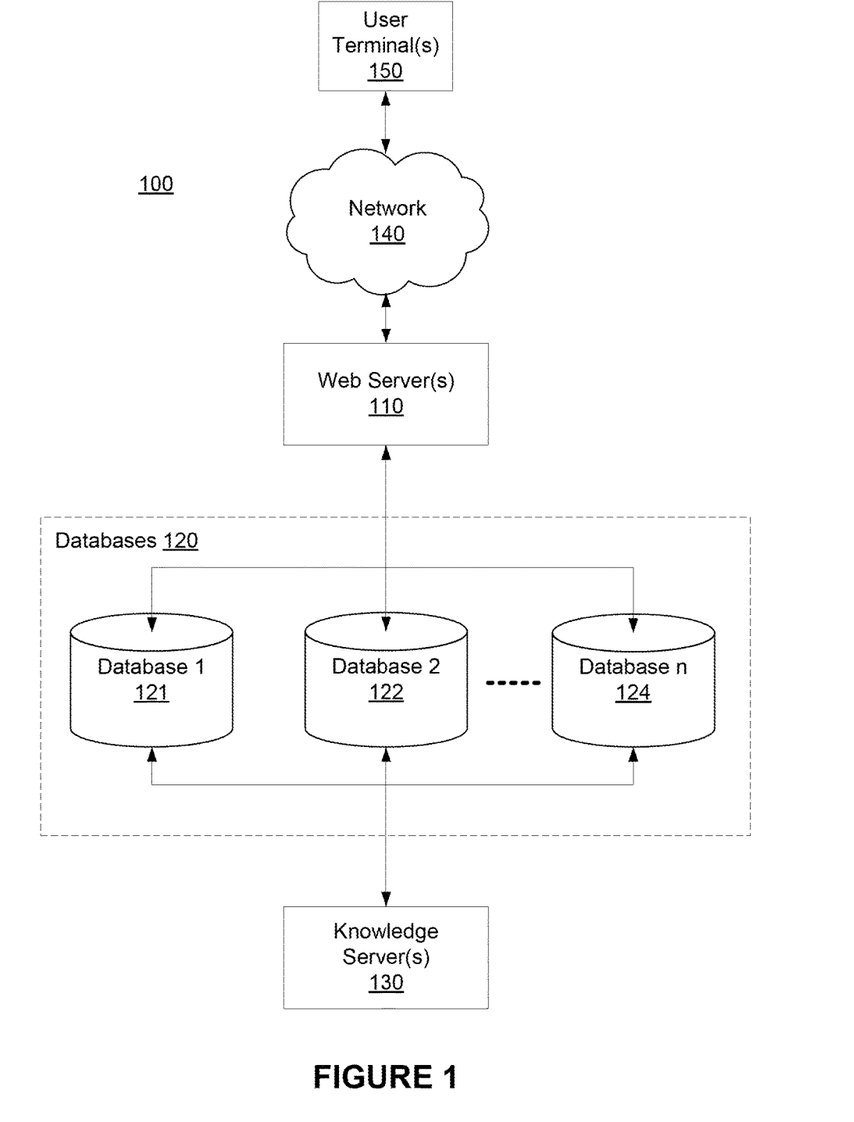
FIG. 1 is a diagram of an example system configured for implementing embodiments consistent with the present disclosure.

FIG. 1 depicts an exemplary system 100 for implementing embodiments of the present disclosure. As shown in FIG. 1, system 100 may include a number of components including, for example, web server 110, databases 120, knowledge server 130, network 140, and at least one user terminal 150. It will be appreciated from this disclosure that the number and arrangement of these components is exemplary only and provided for purposes of illustration. Other arrangements and numbers of components may be utilized without departing from the teachings and embodiments of the present disclosure.

Web server 110 may include one or more computer systems configured to host and/or serve documents such as websites and media files over network 140 (such as the Internet) to one or more user terminals 150. In some embodiments, web server 110 can receive one or more search queries via a search engine operated by web server 110. When the user submits a query, the query may be transmitted from user terminal 150 through network 140 to web server 110. Web server 110 may include, or may be connected to, databases 120 and a search engine (not shown). Web server 110 may respond to the query by locating and retrieving data from databases 120, generating search results, and transmitting the search results through network 140 to user terminal 150 in a form that can be presented to the user (e.g., a search results web page to be displayed in a web browser running on user terminal 150 or a knowledge panel displayed on the search result web page).

For example, in some embodiments, when a query is received by the search engine of web server 110, the search engine identifies documents that match the query or are of the highest ranked documents that are relevant to the query. The search engine may include an indexing engine that indexes documents (e.g., web pages, images, or news articles on the Internet) found in a corpus (e.g., a collection or repository of content), an index database or knowledge base that stores the index information, and a ranking engine (or other software) to rank the resources that match the query. The indexing engine can index information using traditional techniques. In some embodiments, the search engine (or indexing engine thereof) can index document annotations, metadata, objects, relationships between objects, and facts learned about objects using the techniques of the present disclosure.

Databases 120 may include one or more logically and/or physically separate databases such as database 1 121, database 2 122, and database n 124, configured to store data. The data stored in databases 120 may be received from one or more of web server 110, knowledge server 130, user terminals 150, or via conventional input methods (e.g., data entry, data transfer, data uploading, etc.). The data stored in the database 120 may take or represent various forms including, but not limited to, documents such as web pages, presentations, textual content, images, photos, audio files, video files, user profile information, and a variety of other electronic data, or any combination thereof. In some embodiments, databases 120 store one or more knowledge bases (such as a knowledge graph) that store data such as entities, facts about entities, and relationships between entities. In some embodiments, databases 120 may store at least one knowledge graph built and/or updated dynamically by knowledge server 130. Additionally, databases 120 may store information derived from the stored documents, such as context clouds that identify objects/entities in a document.

In some embodiments, databases 120 may be implemented using at least one computer-readable storage medium. In some embodiments, databases 120 may be maintained in a network attached storage device, in a storage area network, or combinations thereof, etc. Furthermore, databases 120 may be maintained and queried using numerous types of database software and programming languages, for example, SQL, MySQL, IBM DB2®, Microsoft Access®, PERL, C/C++, Java®, etc. In some embodiments, databases 120 may include a plurality of networked databases, such as database 1 121, database 2 122, and additional databases up to database n 124, where n can be any number, depending on the capacity needs of web server 110 and/or knowledge server 130.

Knowledge server 130 may include one or more servers configured to communicate and interact with databases 120. Knowledge server 130 may be a general-purpose computer, a mainframe computer, or any combination of these components. In certain embodiments, knowledge server 130 may be standalone computing system or apparatus, or it may be part of a subsystem, which may be part of a larger system. For example, knowledge server 130 may represent distributed servers that are remotely located and communicate over a communications medium (e.g., network 140) or over a dedicated network, for example, a LAN. Knowledge server 130 may be implemented, for example, as a server, a server system comprising a plurality of servers, or a server farm comprising a load balancing system and a plurality of servers.

In some embodiments, knowledge server 130 may implement or provide one or more engines for building and updating knowledge graphs and/or context clouds. Knowledge server 130 may comprise specialized hardware, software modules, or a combination thereof specifically configured to perform data mining functions, knowledge graph creation and update functions, occurrence list creation and update functions, and any other functions associated with the present embodiments. For example, knowledge server may include one or more hardware and/or software modules for analyzing documents stored in databases 120 and performing data mining functions to determine entities and entity relationships in one or more documents, and generate one or more of knowledge graphs, context clouds, and occurrence lists based on the document data. Additionally, knowledge server 130 may dynamically update the knowledge graphs, context clouds, and/or occurrence lists dynamically as the document data changes, and/or periodically according to a predetermined or varying schedule.

Network 140 may include any type of communications networks, or a combination of communications networks. For example, network 140 may include the Internet and/or any type of wide area network, an intranet, a metropolitan area network, a local area network (LAN), a wireless network, a cellular communications network, etc. In some embodiments, web server 110 may be configured to receive requests (e.g., requests based on input provided by one or more users from user terminals 150). For example, user terminals 150 may be configured to transmit search queries to web server 110. In some aspects, web server 110 may also be configured to transmit information through network 140 to user terminals 150. For example, web server 110 may be configured to transmit data (e.g., HTML data including search results and/or data elements) responsive to search queries from user terminals 150.

As further shown in FIG. 1, system 100 may include one or more user terminals 150 operated by one or more users (not shown). By way of example, user terminals 150 may include smartphones, tablets, netbooks, electronic readers, personal digital assistants, personal computers, laptop computers, desktop computers, large display devices, and/or other types of electronics or communication devices. In some embodiments, user terminal 150 is implemented with hardware devices and/or software applications running thereon. In some embodiments, user terminals 150 may be configured to communicate to and/or through network 140 with other clients and components, such as web server 110.

Figure 2:
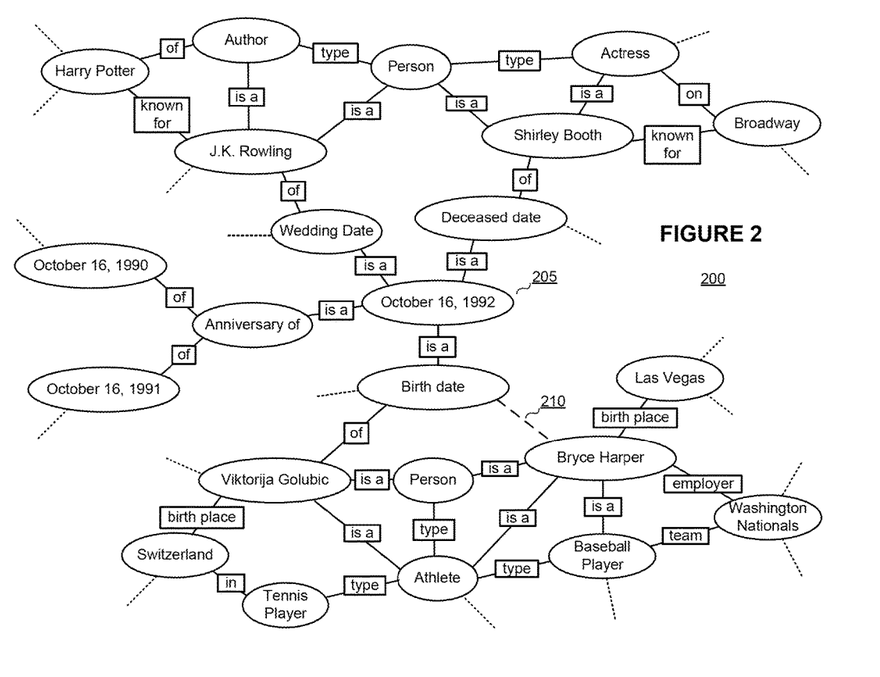
FIG. 2 is an illustration of an example knowledge graph, consistent with examples of the disclosed embodiments.

FIG. 2 is an illustration of an example of a knowledge graph 200. As shown in FIG. 2, knowledge graph may comprise an associative data structure having a plurality of objects (represented by bubbles), with associated meaning, relationships, or other associative connections to other objects in knowledge graph 200. A known connection between two objects is represented by a solid line in knowledge graph 200. In the example shown in FIG. 2, a target object 205, the date Oct. 16, 1992, is connected to many different objects by different types of meanings, relationships, and associations. For example, based on previous analysis and/or manual identification by a user or administrator, knowledge graph 200 identifies Oct. 16, 1992 as a birth date, a wedding date, an anniversary date, and a deceased date of one or more other objects. The other objects may be people, dates, or events. The other objects may be interconnected by certain relationships or associations. For example, "Viktorija Golubic" and "Bryce Harper" may be connected because both objects are athletes, as well as persons. Some connections may be stronger than others, such as when two objects have more in common. Although not illustrated in FIG. 2, the relationships, associations, and other connections between any two objects may be associated with a quantifiable score, value, or weight.

As shown in the example of FIG. 2, knowledge graph 200 may have multiple known relationships or associations for Bryce Harper, yet knowledge graph 200 may not yet know that Oct. 16, 1992 is Bryce Harper's birthdate. This unknown relationship 210 is indicated by a dashed line. Thus, a document may contain the name "Bryce Harper was born on Oct. 16, 1992," yet knowledge server 130 may not automatically know that Oct. 16, 1992 is a birth date. This may occur if the phrase "born on [Month] [Day], [Year]" appears to knowledge server 130 as unstructured or semi-structured data, where knowledge server 130 is only trained to recognize birthdates using data structures such as "birthday is [Month] [Day], [Year]" or "Date of Birth: [Month] [Day], [Year]." The disclosed embodiments provide solutions for knowledge server 130 to automatically determine a meaning or relationship of unstructured or semi-structured data without the need for manual input or an extensive, manually-created database of predefined data structures.

Figure 3:
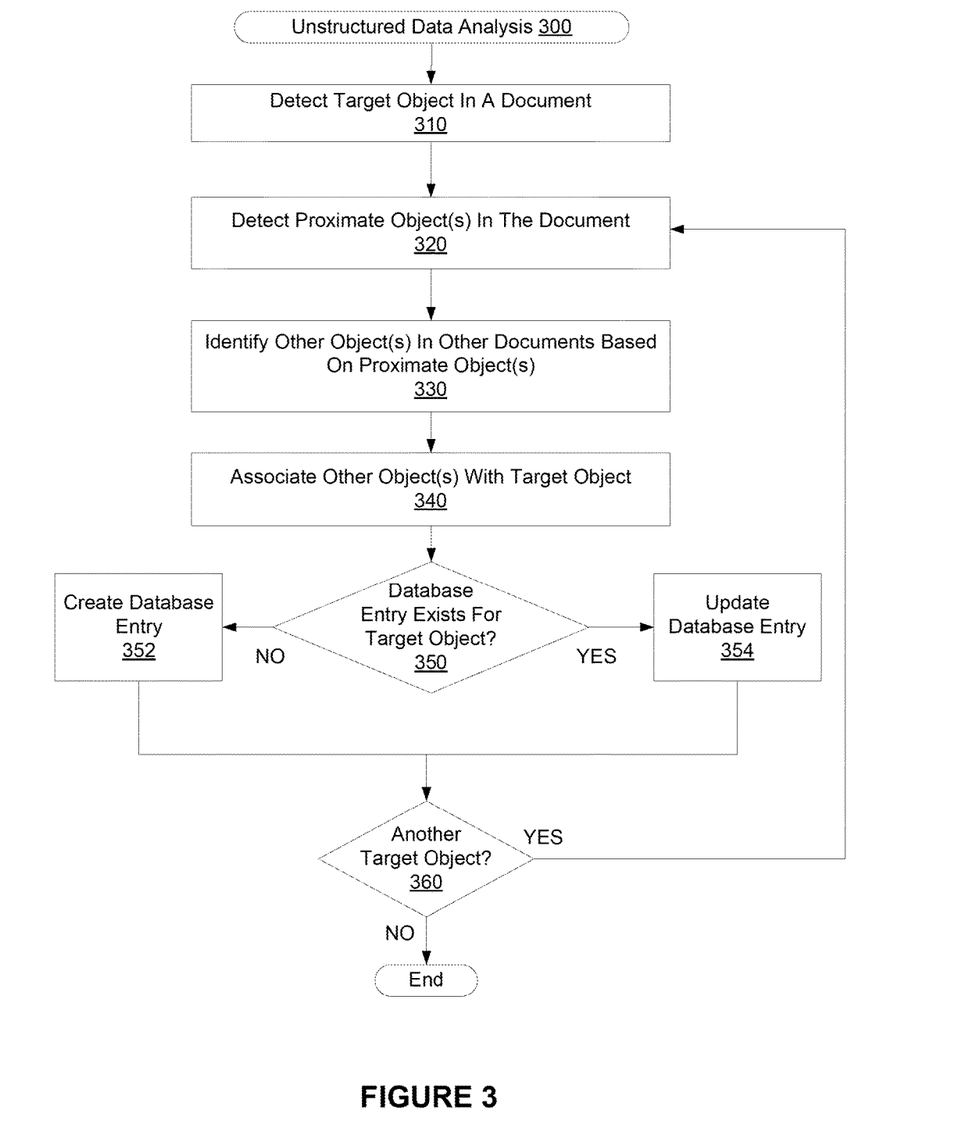
FIG. 3 is a flow diagram of an example process of analyzing unstructured data, consistent with disclosed embodiments.

FIG. 3 is a flow diagram of a process of analyzing unstructured data, consistent with disclosed embodiments. Although unstructured data analysis process 300 is described herein as performed by a processor of knowledge server 130, in some embodiments one or more computers other than knowledge server 130 may perform process 300. Thus, the disclosed embodiments are not meant to be limiting with regard to the particular processor(s) implementing steps of the disclosed methods.

In some embodiments, knowledge server 130 may perform process 300 to determine a meaning or relationship associated with a data object in an unstructured or semi-structured portion of a document. A significant amount of knowledge stored in documents such as the pages of websites is unstructured data, in the sense that machines have a hard time parsing and understanding the meanings and relationships of the unstructured data. Unstructured data usually includes free-form text having a portion, even if very minor, of structured knowledge, such as a free-form sentence with a date that represents a date of birth. While a machine can evaluate the free-form sentence using pre-defined data structures to identify the month, day, and year as a date, the machine may not know that the date represents a date of birth because the free-form sentence may not conform to any predefined data structure for date of birth. Additional examples of unstructured data may include short-form search queries, bits of text formatted in lists or tables, malformatted text, or multi-language text.

Process 300 may begin in step 310, in which knowledge server 130 detects a target object in a document, such as a document on the Internet. Knowledge server 310 may parse the characters (letters, numbers, and symbols) in the document, and identify an object by comparing the parsed characters to a database of words such as a dictionary or other corpus of known words that represent objects.

In step 320, knowledge server 130 may detect one or more proximate objects in the document. In some embodiments, knowledge server 130 may identify proximate objects as objects directly adjacent to the target object in the document, such as a word that appears immediately before or after the target object, or a word that appears directly above or below the target object (such as in a table). In some embodiments, knowledge server 130 may identify more or fewer proximate objects based on, for example, the size of the document and the density of its content, or the location of the target object in the document. As an example, if a document has a large number of paragraphs, knowledge server 130 may identify proximate objects as a subset of words and/or numbers appearing in the same paragraph as the target object. As another example, if the target object is located in a heading or footer of the document, knowledge server 130 may limit proximate objects to those appearing in the header or footer. As yet another example, if a document comprises mostly images with few words, knowledge server 130 may identify all words in the document as "proximate objects."

In step 330, knowledge server 130 may identify other objects in other documents, based on the detected proximate objects. The other documents, and information associated with the other documents, may be considered "seed knowledge," because the other documents may contain previously-identified objects and relationships between objects. For example, the other documents may contain dates, and the dates may already be identified as birthdays, either by a previous manual input from a user or system administrator, or from a previous analysis.

In some embodiments, knowledge server 130 may create and/or recall one or more occurrence lists using the seed knowledge and based on the target object and/or the proximate object. For example, knowledge server 130 may create/recall from memory one or more occurrence lists reflecting all documents stored in databases 120 in which the target object (such as "Oct. 16, 1992") occurs. As another example, knowledge server 130 may create/recall from memory one or more occurrence lists reflecting all documents stored in databases 120 in which the target object and one or more proximate objects occur.

In some embodiments, knowledge server 130 may rank or filter the documents listed in the occurrence lists based on one or more criteria, such as a minimum frequency of occurrence of the target object and/or the proximate objects. For example, knowledge server 130 may generate occurrence lists that only include documents in which the target object occurs at least twice. As another example, knowledge server 130 may rank the documents in the occurrence lists based on, for example, a frequency of occurrence of the target object. Step 330 is discussed in additional detail below with reference to FIG. 5.

In step 340, knowledge server 130 may associate the identified other objects with the target object. In some embodiments, step 340 may comprise associating the target object with one or more of: the other object(s), a relationship or meaning associated with the other object(s), and/or a meaning or relationship associated with the proximate object(s). For example, if knowledge server 130 determines that "Oct. 16, 1992" is a birthdate of Bryce Harper, based on date mentions (other objects) in the other documents, then knowledge server 130 may associate this relationship/meaning of "Oct. 16, 1992" with the target object document.

In step 350, knowledge server 130 may determine whether an entry in databases 120 exists for the target object. In some embodiments, knowledge server 130 may determine whether a knowledge graph has already been created for the target object. In other embodiments, knowledge server 130 may determine whether a record in databases 120, other than a knowledge graph, already exists for information regarding the target object and the target object document. If no entry exists ("No" in step 350), then in step 352 knowledge server 130 may create one or more database entries for the target object within databases 120. The new entry may comprise a new knowledge graph having the target object and a meaning/relationship of the target object, as determined during process 300. In some embodiments, the new entry may comprise a new associative array or other document which knowledge server 130 may use to track object meanings and/or relationships.

If knowledge server 130 determines that a database entry exists for the target object ("Yes" in step 350), then in step 354 knowledge server 130 may update the existing database entry. In some embodiments, the database entry may comprise a knowledge graph, such as knowledge graph 200 of FIG. 2. In such embodiments, knowledge server 130 may update the knowledge graph to reflect the newly discovered meanings and/or relationships. In the example illustrated in FIG. 2, step 350 may include identifying Oct. 16, 1992 as Bryce Harper's birthday, thereby changing the dashed line in unknown relationship 210 to a solid line.

In step 360, knowledge server 130 may determine whether another target object has been identified for analysis. Documents with multiple instances of unstructured and/or semi-structured data may require multiple iterations of process 300, to determine meanings and/or relationships of all target objects appearing in the unstructured and/or semi-structured data. If additional target objects require analysis ("Yes" in step 360), process 300 may return to step 320. If there are no additional target objects requiring analysis ("No" in step 360), then process 300 may end.

In some embodiments, knowledge server 130 may perform process 300 each time a predetermined number of documents are updated. For example, knowledge server 130 may perform process 300 any time a document is updated, or once a certain number of documents (such as three documents) have been updated. Other events may also trigger knowledge server 130 to perform process 300, such as the addition of a new document, or in response to a request received from web server 110, user terminal 150, or from another external device. In some embodiments, knowledge server 130 may perform process 300 according to a schedule, to refresh knowledge graphs on a periodic basis to reflect additions and modifications to the documents stored in databases 120. By performing process 300 in response to triggering events or based on a schedule, system 100 can maximize the accuracy of computerized search results by maintaining complete and accurate knowledge graphs and associative arrays of objects, object meanings, and relationships between objects.

Figure 4:
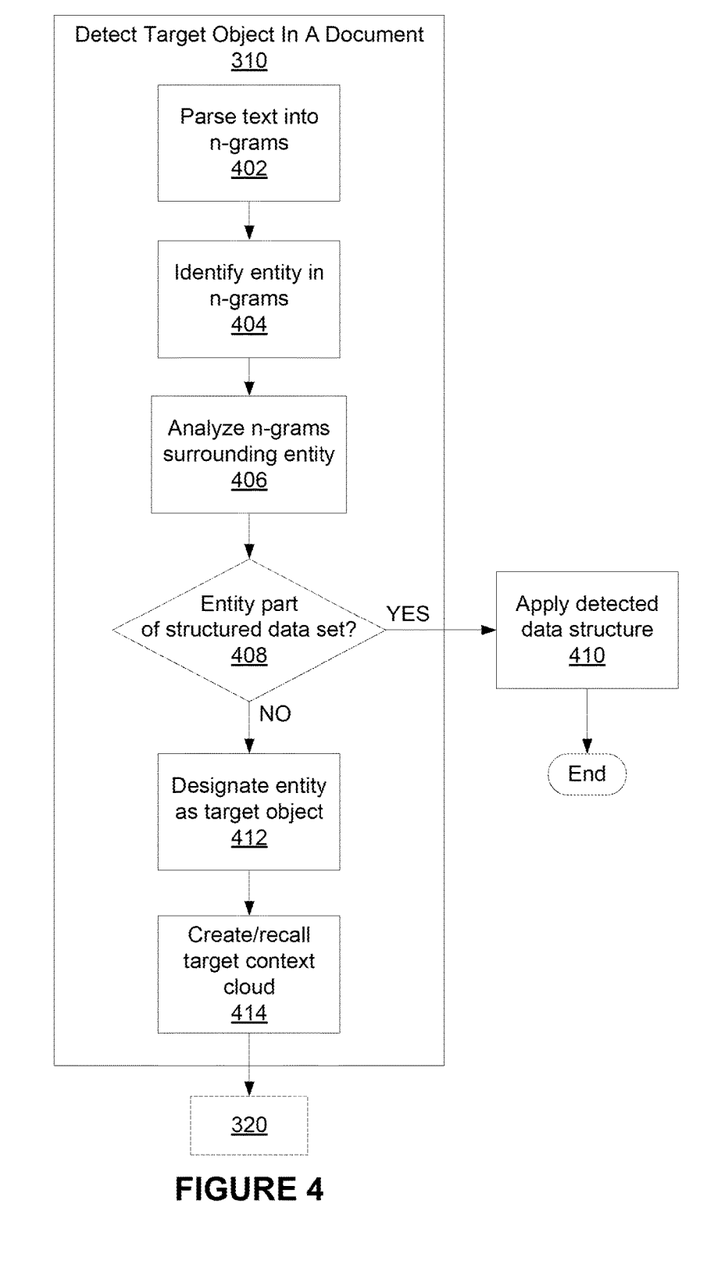
FIG. 4 is a flow diagram of an example process for detecting a target object in a document, consistent with disclosed embodiments.

FIG. 4 is a flow diagram of a process for detecting a target object in a document, consistent with disclosed embodiments. The process illustrated in FIG. 4 may be a sub-routine included in process 300 (such as step 310 of process 300). In step 402, knowledge serve 130 may parse a document into a plurality of n-grams, where "n" is a number of characters. For example, when n=4, knowledge server 130 may parse the characters in the website into 4-character long grams. Knowledge server 130 may repeat this parsing step for a wide range of n values such as, for example, n=1 to 40. In some embodiments, knowledge server 130 may utilize one or more known methods for parsing documents into recognizable words, numbers, symbols, and combinations thereof.

In step 404, knowledge server 130 may analyze the parsed n-grams of varying lengths to identify an entity in the document. In some embodiments, knowledge server 130 may compare the parsed n-grams against a database of known entities such as people, places, things, concepts, and other forms of words. The database may be a dictionary or encyclopedia, or may be a list or matrix of entities stored in databases 120. In some embodiments, knowledge server 130 may search for an exact match between the parsed n-grams and the database. In other embodiments, knowledge server 130 may find a closest match using one or more statistical methods such as confidence level scores and probabilistic determinations, to identify an entity in the parsed n-grams even if the n-gram is misspelled. In such embodiments, an n-gram of "Brice Harper" may be identified as most likely being "Bryce Harper."

In step 406, knowledge server 130 may analyze one or more n-grams surrounding the identified entity, such as the adjacent and proximate n-grams of identified entity in a sentence, paragraph, table, chart, graph, image, or in the entire document. In some embodiments, knowledge server 130 may identify objects within the surrounding and proximate n-grams, and may determine a type of word or number for the entity and surrounding n-grams, such as nouns, verbs, pronouns, adjectives, months, days, years, percentages, times, names, places, etc.

In step 408, knowledge server 130 may determine whether the identified entity and the surrounding n-grams are part of a structured data set. In some embodiments, knowledge server 130 may determine whether the types of words or numbers for the entity and surrounding n-grams conform to a predefined data structure. For example, knowledge server 130 may determine whether object "Oct. 16, 1992" conforms to a predefined data structure of "[Month] [Day], [Year]." In the same example, knowledge server 130 may also determine whether "born on Oct. 16, 1992" conforms to any predefined data structures for birthdays, such as "date of birth: [Month] [Day], [Year]." In some embodiments, knowledge server 130 may compare the object(s) and groups of objects to a database of predefined data structures stored in local memory or in a networked database such as databases 120.

If knowledge server 130 determines that the identified entity and surrounding n-grams conform to a structured data set ("Yes" in step 408), then in step 410 knowledge server 130 may apply the detected data structure to the entity and the surrounding n-grams, to determine a meaning or relationship associated with the identified entity. Following step 410, process 300 may end.

If knowledge server 130 does not detect a structured data set to which the identified entity or the surrounding n-grams conform ("No" in step 408), then the process may proceed to step 412, in which knowledge server 130 may designate the entity as a target object, for analysis to determine a relationship and/or meaning associated with the entity in the unstructured data set. In the example described above, although "Oct. 16, 1992" may conform to a predefined data structure for a "date," the surrounding n-grams "born on" may not conform to a predefined data structure, and may thus appear as free-form text. In this situation, process 300 may continue to determine a meaning and/or relationship associated with the identified entity.

Figure 6:
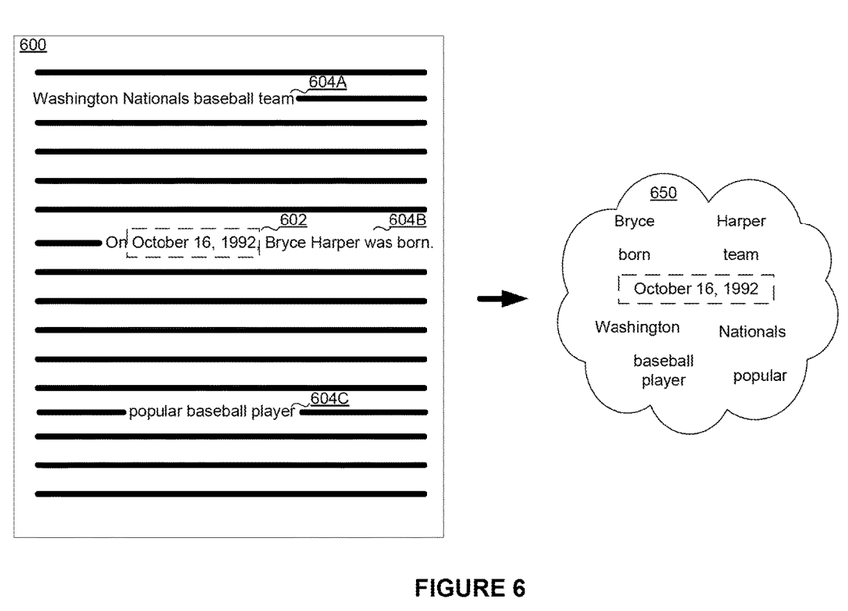
FIG. 6 is an illustration of an example of context cloud creation, consistent with disclosed embodiments.

In step 414, knowledge server 130 may create or recall from memory a context cloud for the target object, referred to as a "target context cloud." Creation of the context cloud is described in further detail with respect to the example embodiment of FIG. 6. In some embodiments, if no target context cloud currently exists for the target object in the document, knowledge server 130 may create a new target context cloud for the target object and the document. Alternatively, if a target context cloud already exists, from a previous analysis and/or manually predefined by a user or system administrator, then knowledge server 130 may recall the target context cloud from memory, such as from databases 120. At the end of step 414, knowledge server 130 has parsed a document, identified an entity in the parsed document, identified n-grams that surround the entity, determined whether the entity and surrounding n-grams conform to a data structure, and created/recalled a target context cloud for the target object (entity).

After step 414, the process may proceed to step 320, in which knowledge server 130 detects proximate objects in the document (see FIG. 3). In some embodiments, step 320 may be performed as part of step 310. For example, knowledge server 130 may detect one or more objects in the n-grams surrounding the entity, as discussed above with respect to 406. In other embodiments, knowledge server may perform step 320 separately from step 406.

Figure 5:
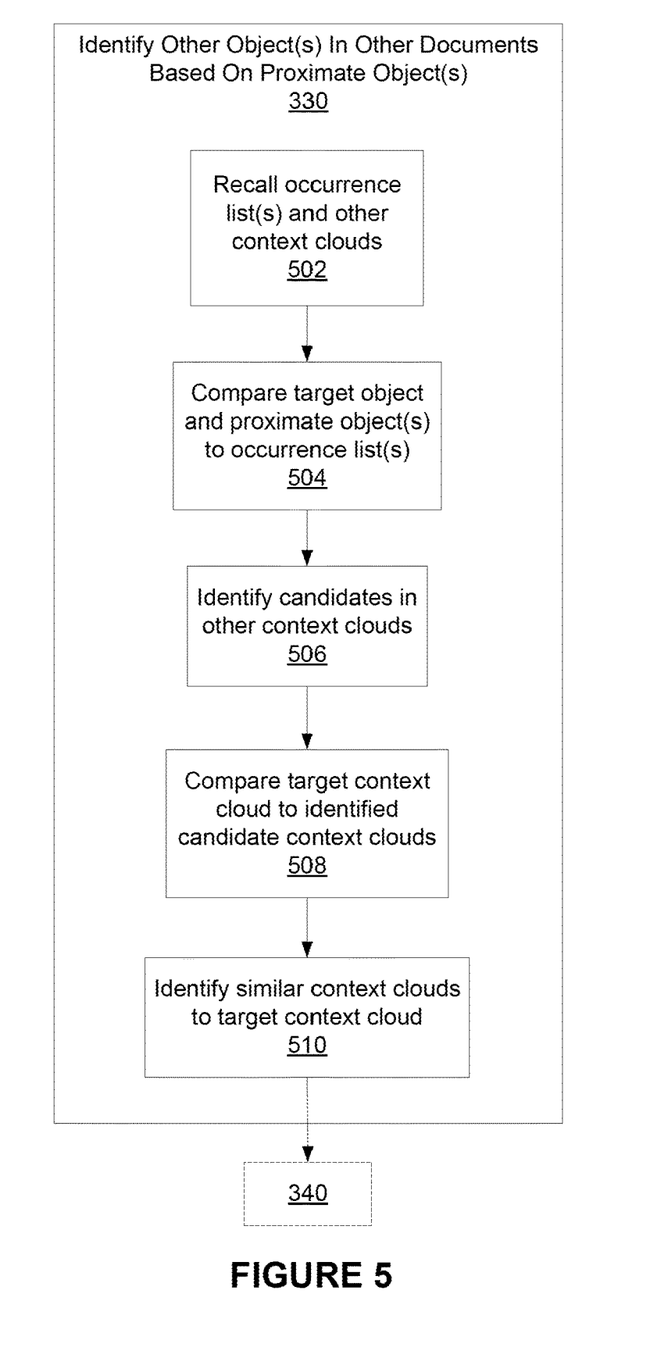
FIG. 5 is a flow diagram of an example process for identifying other objects in other documents based on proximate objects, consistent with disclosed embodiments.

FIG. 5 is a flow diagram of a process for identifying other objects in other documents based on proximate objects, consistent with disclosed embodiments. The process illustrated in FIG. 5 may be a subroutine of step 330 of process 300. Step 330 may follow step 320 of process 300, in which knowledge server 130 identifies one or more proximate objects to a target object.

In step 502, knowledge server 130 may recall one or more occurrence lists and other context clouds. The occurrence lists may identify the words, numbers, and symbols occurring in other documents in database 120. Knowledge server 130 may generate the occurrence lists dynamically and on-demand. Alternatively, knowledge server 130 may periodically update occurrence lists and store the occurrence lists in databases 120. Knowledge server 130 may also recall and/or create one or more context clouds for the documents stored in database 120 and reflected in the occurrence list(s). The context clouds may reflect the target object and the proximate objects occurring in each respective document. In some embodiments, knowledge server 130 may recall/create the context clouds for the other documents after identifying candidate documents (step 506).

In step 504, knowledge server 130 may compare the target object and (optionally) the proximate objects to the one or more recalled occurrence lists. For example, knowledge server 130 may search the occurrence list(s) to identify documents in which the target object appears. The results of this search may be ranked according to a frequency of occurrence, where the documents having the highest number of hits for a search for the target object appear at the top of the list. In some embodiments, knowledge server 130 may search the occurrence list(s) for only the target object, and in other embodiments knowledge server 130 may search the occurrence list(s) for the target object in combination with one or more proximate objects. In some embodiments, knowledge server 130 may search for exact matches in the occurrence list(s), and in other embodiments knowledge server 130 may employ one or more statistical methods to find a "best" or "closest" match, such as by scoring the search results with a confidence level value.

In step 506, knowledge server 130 may identify one or more candidate documents in the other context clouds. Knowledge server 130 may search the occurrence lists for occurrences of the target object in the other documents. In some embodiments, knowledge server 130 may also search the occurrence lists for occurrences of one or more proximate objects identified proximate to the target object. Based on the search results, knowledge server 130 may identify at least one other free-form context in other documents in which the target object appears, where the other free-form context may be associated with proximate objects in the other documents. For example, a target object "Oct. 16, 1992" may occur in the unstructured statement "Bryce Harper was born on Oct. 16, 1992," where "born on" is a proximate object that is the free-form context. In another document, the target object may occur in the statement "Viktorija Golubic's was born Oct. 16, 1992," where "born" or "was born" are proximate objects and the free-form context. In yet another document, "Oct. 16, 1992" may occur in the statement "Shirley Booth passed away on Oct. 16, 1992," where "passed away" is the free-form context. Thus, knowledge server 130 may identify additional free-form contexts in proximate objects of other documents. The other documents may have one or more meanings and/or relationships stored in association with the target object and the free-form contexts, based on a previous analysis or manual input from a user and/or administrator. The meanings and/or relationships from the other documents may give meaning to the target object in the unstructured data, thereby allowing system 100 to use previous knowledge to associate relationships and meanings with unstructured data.

At the end of step 506, one or more candidate documents are identified, which include at least one occurrence of the target object, and optionally also at least one occurrence of one or more proximate objects. For each candidate document, knowledge server 130 may create and/or recall candidate context clouds for occurrences of the target object in the respective candidate documents. For example, knowledge server 130 may create a context cloud for a first candidate document having occurrences of the target object and one or more proximate objects that appear around the target object in the first candidate document. Knowledge server 130 may create a candidate context cloud for each candidate documents. In some embodiments, knowledge server 130 may recall one or more previously-created candidate context clouds from memory, such as from databases 120.

In step 508, knowledge server 130 may compare the target context cloud to the candidate context clouds. In some embodiments, knowledge server 130 may analyze each candidate cloud by comparing objects in the candidate context cloud to objects in the target context cloud, to determine a level of similarity between the two. In some embodiments, knowledge server 130 may score the object comparison using one or more known statistical scoring methods such as a confidence level score.

In some embodiments, knowledge server 130 may determine a score corresponding to a similarity in patterns between the target objects and proximate objects. For example, the target and candidate context clouds may include scores indicative of a distance in the document between the target object and a particular proximate object, such as a directly proportional score of "5" when the target object and proximate object are five words apart. Such a score may be inversely proportional to the distance between the words in the document, where a short distance and closeness of the two objects corresponds to a high score. In such embodiments, knowledge server 130 may compare scores for proximate objects that occur in both the target and candidate context clouds, to detect any patterns of similar phrases or sentences in the candidate and target context clouds. In some embodiments, knowledge server 130 may also determine a score corresponding to a number of matching proximate objects between the target context cloud and each candidate document context cloud.

In step 510, knowledge server 130 may identify one or more candidate context clouds similar to the target context cloud, based on the comparison in step 508. In some embodiments, knowledge server 130 may identify the candidate context cloud with the highest scores as the most similar to the target context cloud. In other embodiments, knowledge server 130 may identify the candidate context cloud with a highest confidence value as the most similar to the target context cloud. A candidate context cloud having a highest score or highest confidence value may correspond to an other document that has a similar sentence, paragraph, or data structure to that of the target document. The other document, which is part of the seed knowledge, may include have one or more meanings and/or relationships associated with the target object, which knowledge server 130 may analyze to estimate a relationship or meaning of the target object in the target document. In some embodiments, knowledge server 130 may rank the candidate context clouds for use in step 340 of process 300.

After step 510, the process may proceed to step 340 (of FIG. 3), in which knowledge server 130 may associate at least one other object with the target object, thereby associating a meaning or relationship with the target object in the unstructured or semi-structured data.

FIG. 6 is an illustration of an example target document and target cloud creation, consistent with disclosed embodiments. As shown in FIG. 6, target document 600 may be a website, such as a biography of Bryce Harper. A target object 602 may be a date (Oct. 16, 1992) that knowledge server 130 has identified as being a [Date], but knowledge server 130 has not identified a meaning or relationship associated with the date. Target object 602 may appear in a sentence that knowledge server 130 has identified as unstructured or semi-structured data: "On Oct. 16, 1992, Bryce Harper was born." Knowledge server 130 may identify a plurality of proximate objects 604A-C around target object 602. It should be understood that knowledge server 130 may identify a number of proximate objects to target object 602 between 1 word near the target object and all words within a predetermined distance from target object 602, and numbers of proximate objects there between.

In some embodiments, knowledge server 130 may create a target context cloud 650 having target object 602 and proximate objects 604A-C. Although not shown in FIG. 6, in some embodiments, target context cloud 650 may include one or numerical scores associated with a distance of each proximate object from the target object.

Figure 7:
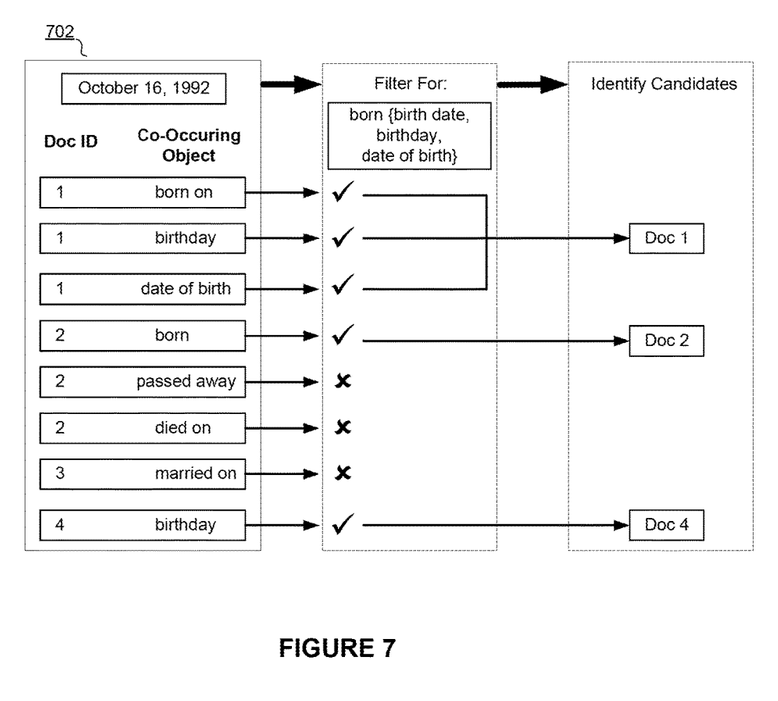
FIG. 7 is an illustration of example processes for filtering an occurrence list and identifying candidate documents, consistent with disclosed embodiments.

FIG. 7 is an illustration of processes for searching and filtering an occurrence list, and identifying candidate documents, consistent with disclosed embodiments. As shown in FIG. 7, knowledge server 130 may generate one or more occurrence lists such as occurrence list 702. Occurrence list 702 may include other documents stored in databases 120 in which the target object "Oct. 16, 1992" appears. Occurrence list 702 may include information such as, for example, an identification of each document in the occurrence list, and one or more proximate objects that co-occur in the other documents within a predetermined distance from the target object. In some embodiments, knowledge server 130 may select a free-form context proximate to the target object for inclusion in occurrence list 702. In the illustrated example, document 1 includes the free-form contexts "born on," "birthday," and "date of birth" co-occurring proximate to the target object. Document 2 includes the free-form contexts "born" and "passed away" proximate to the target object, document 3 includes the free-form context "married on" proximate to the target object, and document 4 includes the free-form context "birthday" proximate to the target object. At this stage, knowledge server 130 may not need to know the meanings or relationships associated with the target object and free-form contexts in the other documents.

In some embodiments, knowledge server 130 may filter occurrence list 702 to identify documents that include one or more proximate objects (such as a free-form context) of the target document, or known variations thereof. In the example shown, knowledge server 130 may filter occurrence list to identify documents which contain the free-form context "born" as a proximate object to the target object, as well as known variants "birth date," "birthday," or "date of birth," as identified using a dictionary, thesaurus, or other associative array. In the example, documents 1, 2, and 4 include at least one match, and knowledge server 130 may identify those documents as candidate documents for comparison to the target document. Knowledge server 130 may then create and/or recall one or more candidate context clouds associated with documents 1, 2, and 4.

Figure 8:
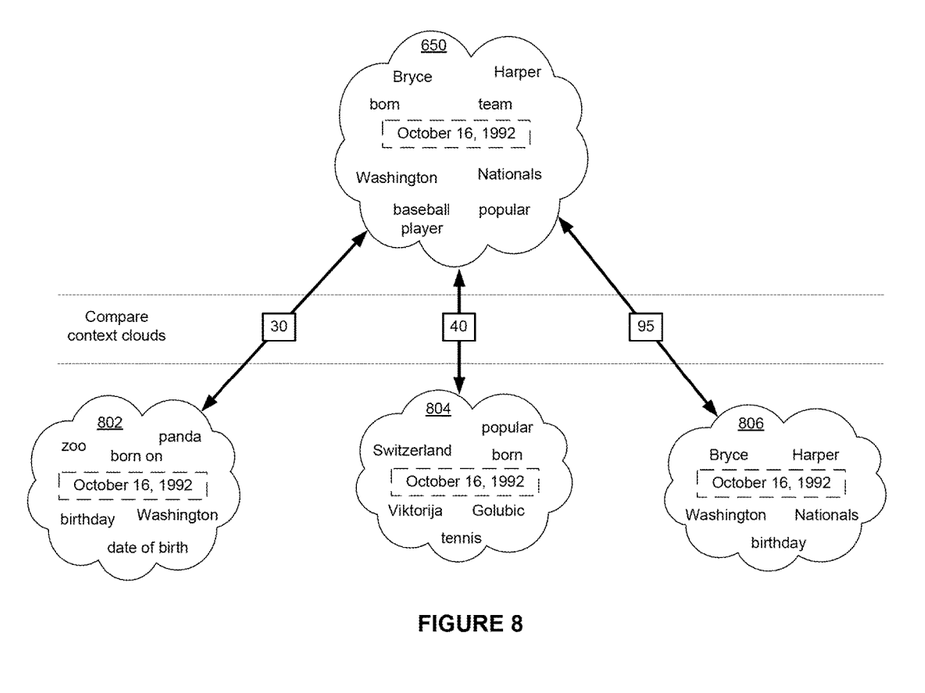
FIG. 8 is an illustration of an example context cloud comparison process, consistent with disclosed embodiments.

FIG. 8 is an illustration of a context cloud comparison, consistent with disclosed embodiments. In the example shown, knowledge server 130 may compare the three candidate context clouds associated with documents 1, 2, and 4 (of FIG. 7) to target context cloud 650. In particular, knowledge server 130 may compare candidate context cloud 1 802 (associated with document 1), candidate context cloud 2 804 (associated with document 2), and candidate context cloud 3 806 (associated with document 4) to target context cloud 650. In some embodiments, knowledge server 130 may score the comparison of each candidate context cloud, to identify at least one candidate context cloud that is most similar in content to target context cloud 650.

As shown in FIG. 8, a comparison between candidate context cloud 1 802 and target context cloud 650 may result in a relatively low score, such as "30" on an exemplary scale of 1-100 (100 meaning identical and 0 meaning no similarities). Although candidate context cloud 1 802 and target context cloud 650 both contain the target object "Oct. 16, 1992," and the proximate object "born," there are no other similarities. Therefore, knowledge server 130 may rank document 1 last on a ranking of document similarity to the target document. Candidate context cloud 2 804, although closer in similarity having matches for the target object and the "born" and "popular" proximate objects, may also have a relatively low score of 40, though higher in relation to the score for candidate context cloud 1 802. Therefore, knowledge server 130 may rank document 2 higher in similarity than document 1.

Finally, knowledge server 130 may calculate a very high score for candidate context cloud 3 806, because almost all words match those of target context cloud 650. Therefore, knowledge server 130 may rank candidate context cloud 3 806 highest of the three candidate context clouds, and knowledge server 130 may select associated document 4 for further analysis with respect to the target object. For example, knowledge server 130 may determine whether document 4 has previously defined relationships and/or meanings associated with the target object and one or more proximate objects in document 4, either based on a previous analysis of document 4's content, or by manual input from a user and/or administrator. In the example shown, document 4 may have a stored relationship between "Oct. 16, 1992" and "birthday," identifying that the date is Bryce Harper's birthday. Using the knowledge associated with document 4, knowledge server 130 may determine that the target object also refers to Bryce Harper's birthday. Thus, knowledge server 130 may store this meaning/relationship of "Oct. 16, 1992," and update unknown relationship 210 in knowledge graph 200 with the meaning of the date based on its relationship to "birthday" in document 4.

In some embodiments, if document 4 does not have any useful stored relationships or meanings with respect to the target object, then knowledge server 130 may look to the next-highest ranked candidate document based on the comparison in FIG. 8, and determine whether the next document contains useful meanings and/or relationships. In some embodiments, knowledge server 130 may analyze only candidate documents having a candidate context cloud with a similarly/confidence score above a predetermined threshold, such as 60/100. In such embodiments, knowledge server 130 may not end the process if no other qualifying candidate documents exist. Knowledge server 130 may therefore leave the relationship between the target and proximate objects in the target document unknown, or send a query to a user and/or an administrator requesting input to improve one or more knowledge graphs.

Figure 9:
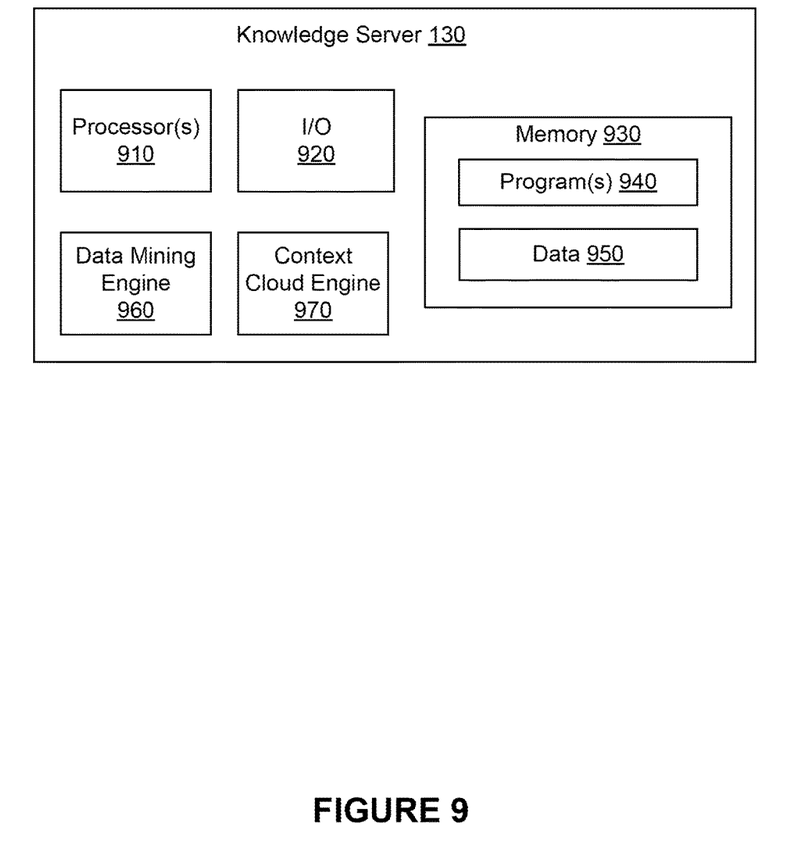
FIG. 9 is a diagram of an example knowledge server configured for implementing aspects of the disclosed embodiments.

FIG. 9 illustrates an example knowledge server 130 for implementing some embodiments and aspects of the present disclosure. The arrangement and number of components in knowledge server 130 is provided for purposes of illustration, and additional arrangements, number of components, and other modifications may be made, consistent with the present disclosure.

As shown in FIG. 9, knowledge server 130 may include one or more processors 910 for executing instructions. Processors suitable for the execution of instructions include, by way of example, both general and special purpose microprocessors, and any one or more processors of any kind of digital computer.

In some embodiments, knowledge server 130 may include one or more input/output (I/O) devices 920. By way of example, I/O devices 920 may include physical keyboards, virtual touch-screen keyboards, mice, joysticks, styluses, etc. Moreover, I/O devices 920 may include loudspeakers, handset speakers, microphones, cameras, or sensors such as accelerometers, temperature sensors, or photo/light sensors.

In some embodiments, I/O devices 920 may include one or more communications interfaces, to facilitate data transfer knowledge server 130, network 140, other components of system 100, and/or other components. Examples of communications interfaces may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. In some embodiments, a communications interface may transfer software and data in the form of signals, which may be electronic, electromagnetic, optical, or other signals capable of being received by the communications interface. These signals may be provided to the communications interface via a communications path (not shown), which may be implemented using wireless, wire, cable, fiber optics, radio frequency ("RF") link, and/or other communications channels.

In some embodiments, knowledge server 130 may include one or more displays for displaying data and information (not shown), such as, for example, websites, web pages, media files, search results, and administrative tools. A display may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of commercially available display.

As further illustrated in FIG. 9, knowledge server 130 may include one or more storage devices configured to store data and/or software instructions used by the one or more processors 910 to perform operations consistent with disclosed aspects. For example, knowledge server 130 may include a memory 930 configured to store one or more software programs 940 that performs functions or operations when executed by the one or more processors 910. By way of example, memory 930 may include NOR or NAND flash memory devices, Read Only Memory (ROM) devices, Random Access Memory (RAM) devices, etc. Memory 930 may also include storage mediums such as, for example, hard drives, solid state drives, tape drives, RAID arrays, etc. Although FIG. 9 shows only one memory 930, knowledge server 130 may include any number of memories 930. Further, although FIG. 9 shows memory 930 as part of knowledge server 130, memory 930 may be located remotely and knowledge server 130 may be able to access memory 930 via network 140. In some embodiments, memory 930 may store data 950 such as, for example, data necessary to execute programs 940, or other data collected, analyzed, and/or generated while performing methods of the disclosed embodiments.

In some embodiments, knowledge server 130 may include a data mining engine 960. For example data mining engine 960 may be configured to gather data and/or relationships between detected objects in data in documents, including websites, files, and any other structured or unstructured data sets. In some embodiments, data mining engine may populate one or more occurrence lists, such as occurrence list 702 of FIG. 7, by analyzing parsed data in documents, identifying objects in the parsed data, and storing the objects in one or more associative arrays including an identification of the document.

In some embodiments, knowledge server 130 may include a context cloud engine 970, for generating and/or updating context clouds based on the data gathered by data mining engine 960. In some embodiments, context cloud engine 970 may generate one or more context clouds for a target object in a document, by identifying one or more objects proximate to the target object, for inclusion in the cloud. For example, context cloud engine 970 may identify one or more proximate objects adjacent to a target object, in a same sentence as the target object, in a same paragraph as the target object, and in the same document as the target object. In some embodiments, context cloud engine 970 may assign a weight to each of the identified proximate objects based on, for example, a spatial distance between the target object and the respective proximate object in the document. Knowledge server 130 may interpret the weight (or score) applied to each proximate object to estimate a level of affiliation between the proximate object and the target object, proportional to the weight.

Data mining engine 960 and context cloud engine 970 may be implemented as specialized hardware, software, or a combination thereof, for performing specialized functions associated with the disclosed methods. In some embodiments, knowledge server 130 may include more or fewer engines for performing functions consistent with the present embodiments such as, for example, detecting target objects in documents, detecting proximate objects, identifying other objects in other documents based on the proximate objects, and associating the other objects with the target object.

The disclosed embodiments are not limited to separate programs or computers configured to perform dedicated tasks. For example, server 130 may include memory 930 that stores a single program or multiple programs. Additionally, server 130 may execute one or more programs located remotely from server 130. In some example embodiments, server 130 may be capable of accessing separate web server(s) or computing devices that generate, maintain, and provide web sites and/or event creation and notification services.

The present specification describes various exemplary embodiments and features with reference to the accompanying drawings. It will, however, be evident that various modifications and changes may be made thereto, and additional embodiments and features may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Moreover, while embodiments of the present disclosure have been described with reference to the processing of point-of-interest data, embodiments of the present disclosure may be applied to process and ingest other types of data. Other implementations are also within the scope of the following exemplary claims.

Therefore, it is intended that the disclosed embodiments and examples be considered as exemplary only, with a true scope of the present disclosure being indicated by the following claims and their equivalents.

What is claimed is:

1. A computer-implemented system for generating and utilizing knowledge graphs, comprising:
    a memory device that stores a set of instructions; and
    at least one processor that executes the instructions to:
        detect a target data object in a document on the Internet;
        detect a second data object, based on the second data object being proximate to the target data object in the document;
        identify a third data object associated with the second data object, based on a frequency of co-occurrence of the second data object and the third data object in one or more stored occurrence lists;
        determine a relationship associated with the target data object based on the identified third data object;
        generate, in a knowledge graph stored in a database, a first entry including the target data object, and the relationship between the target data object and an additional data object in the document;
        receive a query;
        identify that the generated first entry from the knowledge graph is responsive to the query;
        generate a search result based on the first entry from the knowledge graph; and
        transmit the search result for presentation in response to the query.

2. The computer-implemented system of claim 1, wherein at least one of the first data object, the second data object, or the third data object is an n-gram.

3. The computer-implemented system of claim 1, wherein the at least one processor is further configured to:
    identify a fourth data object proximate to the first data object;
    identify a fifth data object associated with the fourth data object based on one or more stored occurrence lists identifying a second predefined relationship between the fourth data object and the fifth data object; and
    update the first entry in the knowledge graph to include at least one of the second predefined relationship or the fifth data object.

4. The computer-implemented system of claim 1, wherein the at least one processor is further configured to:
    determine, based on the first entry, a context of the first data object.

5. The computer-implemented system of claim 1, wherein the first data object is adjacent to the second data object.

6. A computer-implemented method for generating and utilizing knowledge graphs, comprising:
    detecting, by at least one processor, a target data object in a document on the Internet;
    detecting, by the at least one processor, a second data object, based on the second data object being proximate to the target data object in the document;
    identifying, by the at least one processor, a third data object associated with the second data object, based on a frequency of co-occurrence of the second data object and the third data object in one or more stored occurrence lists;
    determining a relationship associated with the target data object based on the identified third data object;
    generating in a knowledge graph stored in a database, a first entry including the target data object, and the relationship between the target data object and an additional data object in the document;
    receiving a query;
    identifying that the generated first entry from the knowledge graph is responsive to the query;
    generating a search result based on the first entry from the knowledge graph; and
    transmitting the search result for presentation in response to the query.

7. The computer-implemented method of claim 6, wherein at least one of the first data object, the second data object, or the third data object is an n-gram.

8. The computer-implemented method of claim 6, further comprising:
    identifying a fourth data object proximate to the first data object;
    identifying a fifth data object associated with the fourth data object based on one or more stored occurrence lists identifying a second predefined relationship between the fourth data object and the fifth data object; and
    updating the first entry in the knowledge graph to include at least one of the second predefined relationship or the fifth data object.

9. The computer-implemented method of claim 6, further comprising:
    determining, based on the first entry, a context of the first data object.

10. The computer-implemented method of claim 6, wherein the first data object is adjacent to the second data object.

11. A non-transitory computer readable medium storing instructions which, when executed, cause at least one processor to perform a method for generating knowledge graphs, the method comprising:
    detecting a target data object in a document on the Internet;
    detecting a second data object, based on the second data object being proximate to the target data object in the document;
    identifying a third data object associated with the second data object, based on a frequency of co-occurrence of the second data object and the third data object in one or more stored occurrence lists;

determining a relationship associated with the target data object based on the identified third data object;

generating in a knowledge graph stored in a database, a first entry including the target data object, and the relationship between the target data object and an additional data object in the document;

receiving a query;

identifying that the generated first entry from the knowledge graph is responsive to the query;

generating a search result based on the first entry from the knowledge graph; and transmitting the search result for presentation in response to the query.

12. The method of claim 11, wherein at least one of the first data object, the second data object, or the third data object is an n-gram.

13. The method of claim 11, further comprising:

identifying a fourth data object proximate to the first data object;

identifying a fifth data object associated with the fourth data object based on one or more stored occurrence lists identifying a second predefined relationship between the fourth data object and the fifth data object; and updating the first entry in the knowledge graph to include at least one of the second predefined relationship or the fifth data object.

14. The method of claim 11, further comprising:

determining, based on the first entry, a context of the first data object.

15. The method of claim 11, wherein the first data object is adjacent to the second data object.

* * * * *